(12) United States Patent
Singh et al.

(10) Patent No.: US 12,384,992 B2
(45) Date of Patent: Aug. 12, 2025

(54) AROMA EXTRACTION

(71) Applicant: Carlsberg Supply Company AG, Ziegelbrücke (CH)

(72) Inventors: Surinder Singh, Ziegelbrücke (CH); Michael Jakob, Ziegelbrücke (CH)

(73) Assignee: Carlsberg Supply Company AG (CH)

( * ) Notice: Subject to any disclaimer, the term of this patent is extended or adjusted under 35 U.S.C. 154(b) by 656 days.

(21) Appl. No.: 17/260,370

(22) PCT Filed: Jul. 19, 2019

(86) PCT No.: PCT/EP2019/069507
§ 371 (c)(1),
(2) Date: Jan. 14, 2021

(87) PCT Pub. No.: WO2020/016412
PCT Pub. Date: Jan. 23, 2020

(65) Prior Publication Data
US 2021/0301231 A1    Sep. 30, 2021

(30) Foreign Application Priority Data

Jul. 20, 2018    (EP) .................................. 18184617

(51) Int. Cl.
*C12C 3/08* (2006.01)
*C12C 5/02* (2006.01)
(Continued)

(52) U.S. Cl.
CPC ................ *C12C 3/085* (2013.01); *C12C 3/08* (2013.01); *C12C 5/026* (2013.01); *C12C 7/287* (2013.01); *C12C 11/11* (2013.01)

(58) Field of Classification Search
CPC ........... C12C 3/08; C12C 3/085; C12C 5/026; C12C 7/287; C12C 11/11
See application file for complete search history.

(56) References Cited

U.S. PATENT DOCUMENTS 2,830,904 A    4/1958 Holger et al.
3,222,181 A *  12/1965 Hoelle ...................... C12C 3/08
                                                    426/429
(Continued)

FOREIGN PATENT DOCUMENTS

BE       527911 A     4/1957
CN       1444553 A    9/2003
(Continued)

OTHER PUBLICATIONS

Albanese, et al., "Beer-brewing powered by controlled hydrodynamic cavitation: Theory and real-scale experiments", (2016), doi: 10.1016/j.jclepro.2016.11.162. Accepted Manuscript to appear in Journal of Cleaner Production, accepted Nov. 2016 (abstract only).

(Continued)

*Primary Examiner* — Ibrahime A Abraham
*Assistant Examiner* — Joe E Mills, Jr.
(74) *Attorney, Agent, or Firm* — McNeill PLLC

(57) ABSTRACT

The invention regards an aroma extraction unit, comprising: —a hydration tank containing a mixture of plants or parts thereof and a liquid, said tank configured to contain a positive gas flow pressure, —a shearing unit configured for shearing the plants or parts thereof, —a hydrodynamic cavitation unit, and —at least one circulation unit, wherein the hydration tank, shearing unit, cavitation unit are in fluid communication, and the at least one circulation unit is configured for circulating the mixture from the tank into the shearing unit, further into the cavitation unit, and from the cavitation unit back into the tank and/or shearing unit.

11 Claims, 4 Drawing Sheets

(51) Int. Cl.
*C12C 7/28* (2006.01)
*C12C 11/11* (2019.01)

(56) References Cited

U.S. PATENT DOCUMENTS

| | | | |
|---|---|---|---|
| 6,242,038 | B1 | 6/2001 | Guzinski et al. |
| 9,018,404 | B2 | 4/2015 | Brophy |
| 9,474,301 | B2 | 10/2016 | Gordon et al. |
| 9,528,075 | B2 | 12/2016 | Kozyuk et al. |
| 9,701,922 | B2 | 7/2017 | Kozyuk et al. |
| 2010/0004419 | A1* | 1/2010 | Hassan ............ C07C 29/04 568/303 |
| 2010/0047386 | A1 | 2/2010 | Tatera |
| 2010/0104705 | A1 | 4/2010 | Gordon et al. |
| 2014/0220222 | A1 | 8/2014 | Murakami et al. |
| 2016/0289619 | A1* | 10/2016 | Mancosky ........ B01F 27/2722 |
| 2017/0051231 | A1 | 2/2017 | Mancosky |
| 2017/0298309 | A1* | 10/2017 | Beehler ............ C12C 3/00 |
| 2020/0017808 | A1* | 1/2020 | Bauer ............ C12C 7/042 |

FOREIGN PATENT DOCUMENTS

| | | | |
|---|---|---|---|
| CN | 103534015 A | | 1/2014 |
| EP | 2367623 B1 | | 8/2016 |
| EP | 2616156 B1 | | 10/2018 |
| GB | 788357 A | | 1/1958 |
| JP | 2010517559 A | | 5/2010 |
| RU | 2634870 C1 * | 11/2017 | ............ C12C 3/12 |
| WO | 2002002497 A | | 1/2002 |
| WO | 2008099325 A2 | | 8/2008 |
| WO | 2010051050 A1 | | 5/2010 |
| WO | 2010077823 A3 | | 9/2010 |
| WO | 2013027369 A1 | | 2/2013 |
| WO | 2013099535 A1 | | 7/2013 |
| WO | 2016161303 A1 | | 10/2016 |
| WO | 2018029715 A1 | | 2/2018 |
| WO | 2018061011 A1 | | 4/2018 |

OTHER PUBLICATIONS

Cavitation Hop Extraction For Brewery, 2015, available in video at https://www.youtube.com/watch?v=pssec5RuDR0.
Ciriminna et al., "Beer produced via hydrodynamic cavitation retains higher amounts of xanthohumol and other hops prenylflavonoids", LWT, vol. 91, pp. 160-167, 2018 (abstract only).
Gomez, et al., "Use of Microscopic Pressurized Shockwaves Generated by Controlled Cavitation as a Nonshear Method of Increased Extraction of Hop α-Acids and Conversion into IBU and Extraction of Hop Oils," Master Brewers Association of the Americas, Technical Quarterly, 2016 (abstract only).
Hoggan, et al., "Ultrasonic hop extraction," Ultrasonics, vol. 6, Issue 4, pp. 217-219, 1968 (abstract only).
International Search Report issued in International Application No. PCT/EP2019/069507, mailed Jan. 27, 2020, 6 pages.
Toru Kishimoto et al., "Analysis of hop-derived terpenoids in beer and evaluation of their behavior using the stir bar-sorptive extraction method with GC-MS", J. Agric. Food Chem., vol. 53, May 13, 2005 (May 13, 2005), p. 4701-4707, XP055652444 (abstract only).

* cited by examiner (A)

(B)

(C)

(D)

AROMA EXTRACTION

CROSS-REFERENCE TO RELATED APPLICATIONS

This application is a national phase entry pursuant to 35 U.S.C. § 371 of International Application No. PCT/EP2019/069507, filed Jul. 19, 2019, which claims the benefit of priority to European Application No. 18184617.1, filed Jul. 20, 2018, the contents of each of which are incorporated by reference herein in their entirety for any purpose.

FIELD OF INVENTION

The present invention relates to an aroma extraction unit, a system for producing a product comprising said aroma extract, a method for producing an aroma extract, a method of producing a beverage product comprising said aroma extract. Particularly, the present invention relates to a hop aroma extraction unit, a system for producing a beer product, as well as a method of producing a hop aroma extract, and a method of producing a beer product, as well as a hop extract and a beer product.

BACKGROUND OF INVENTION

Active compounds for commercial products, such as pharmaceuticals, perfumes, food and beverage consumables, may be extracted from plant materials. For example, extractions from hops may constitute main aromas, or flavors, in beer products. The extracted substances from hops may include both bitter aromas (e.g. tannins), as well as the more tasteful aromas (e.g. humulene, myrcene and linalool).

The efficiency and selectivity of the extraction process will depend on the extraction parameters. Thus, certain extraction parameters may facilitate a higher selectivity of certain compounds, e.g. aroma compounds. Also, the extraction parameters may facilitate a higher extraction efficiency or utilization, i.e. a higher amount of the substances originally present in the plant material become extracted.

The traditional production of beer includes boiling of a mixture of wort together with hops. Thus, hop compounds, mainly bitter flavours are extracted into the wort during the boiling process. Subsequent to boiling, the boiled wort is transferred to a fermentation tank and fermented by addition of yeast, and the yeast is later removed before the beer is stored in the lagering, or maturation tank, ready for further use, e.g. filtering and/or bottling or kegging. In order to obtain good hop aromas in beer, hop oils may be added later in the process e.g. during fermentation or lagering. Instead of using hop oils, hop aromas may also be obtained by a method known as "dry hopping". Typically, the dry hopping process comprises adding hops in the form of pressed hops pellets to wort in the fermentation tank at the onset or during wort fermentation. The hops pellets typically consist of dried, milled and compressed hops or parts thereof, typically hop leaves and cones. Since the aromas are extracted directly into the fermenting wort, the temperature at extraction is restricted to the fermentation temperatures, which are usually selected in order to optimize the conditions for the yeast. These circumstances render controlling the amount and ratios of extracted substances difficult.

U.S. Pat. No. 2,830,904 [1] discloses a method for producing a separate hop extract, which may be added to the beer in the lagering tank. The hop is extracted in water or wort upon exposure to ultrasound cavitation, temperatures around or below 95° F. (corresponding to 35° C.), and $CO_2$ at neutral- or under pressure to prevent oxidation during the ultrasound treatment.

SUMMARY OF INVENTION

There is a need for improving aroma extraction, since improvements in aroma extraction efficiency and/or aroma extraction selectivity will provide more flexible and more cost-efficient manufacture of the products comprising aromas, as well as products with increased shelf life.

For example, if the aroma extraction efficiency is increased, a higher amount of extracted aromas is obtained for a given amount of plant material. Correspondingly, if the aroma extraction selectivity is increased, a higher amount of selected or desired aroma components is extracted for a given amount of plant material. Thus, improvements in extraction efficiency and/or selectivity implicitly means higher raw material utilization, lower material waste, and hence a more cost-efficient production. Also, since aromas tend to decompose during storage, an increased amount of aromas or selected aroma within a given product, will increase the product shelf life.

Furthermore, improved aroma extraction may facilitate increased production flexibility, including production upscaling. For example, if the aroma extraction efficiency and/or selectivity is increased, a similar extraction may be obtained when using a continuous extraction processes, compared to a batch extraction process. A continuous extraction process is typically faster, simpler, and more easily upscaled to larger volumes, compared to a batch process.

The embodiments of the disclosure described in the following may be extended to any aroma extraction. Examples of aroma extraction include hop extraction for beer production, and aroma extraction from other plants or parts thereof, e.g. plant leaf, blade, bud, stem, root, and fruits, e.g. orange peels, green tea, and ginger, for alcoholic as well as non-alcoholic drinks and beverages. The hop extraction for beer production may further include any beer product, including lagers, ales, porters, and non-alcoholic beers.

In the following, the embodiment are exemplified based on hop extraction. Particularly for hop extraction, there is a need for improving the control of the hop extraction process, as well as for improving the extraction efficiency and selectivity. In particular, there is a need for improving the extraction efficiency. Further improvements in the extraction process may provide increased flexibility in the beer production, and more cost-efficient production methods due to the inherent higher material utilization and lower material waste, as well as longer shelf life of the beer products.

The present invention provides a hop extraction unit and a related method providing a surprisingly efficient hop extraction, a surprisingly selective extraction of the tasteful aromas, and a more reliable and safe extraction process, as well as a less complex, and more simple and flexible beer production process. One particular advantage of the invention is the efficient hop extraction, which improves the utilisation of this raw material.

The hop extract obtainable from the extraction unit and related method may have a composition and consistency such that it is easily added and mixed to a fluid, such as a beer product. Further advantageously, the provided hop extract has a chemical composition with a high affinity for mixing with a fluid, meaning that the intermolecular forces between the extract and a fluid may be strong, thereby facilitating homogeneous and stable mixtures, where there is an intimate contact between the extract and the fluid.

Further advantageously, the provided hop extract has a composition, or concentration, such that the volumes required are small, and the provided hop extract further advantageously has a consistency, or viscosity, such that it is easily added in controllable and/or small amounts.

Advantageously, the hop extract and the extraction unit is used for a system for producing a beer product, and for a method of producing a beer product. Further advantageously, the hop extract may be added at any point in the beer production process, e.g. late in the production process such as immediately before filtration and kegging, thus providing a more flexible and cost-efficient beer production.

Thus, the invention provides a hop aroma extraction unit, comprising:
- a hydration tank containing a mixture of hops or parts thereof and a liquid, said tank configured to contain a positive gas flow pressure,
- a shearing unit configured for shearing the hop,
- a hydrodynamic cavitation unit, and at least one circulation unit, wherein the hydration tank, shearing unit, cavitation unit are in fluid communication, and the at least one circulation unit is configured for circulating the mixture.

The invention furthermore provides systems for producing a beer product, comprising:
- a fermentation container configured for containing fermenting wort,
- optionally a separation unit configured for removing a part of the solids of fermented wort, thereby converting the fermented wort into green beer,
- the hop aroma extraction unit according to the invention,
- at least one pumping unit, wherein the fermentation container, separation unit, and extraction unit are in fluid communication, and the at least one pumping unit is configured as transfer means.

In a preferred embodiment, the fermentation container, separation unit, and extraction unit are in continuous fluid communication. Most preferably, the fermentation container, separation unit, and extraction unit are in partial continuous fluid communication.

The invention also provides methods of producing a hop aroma extract, comprising the steps of:
a) providing a container containing a mixture of hop or parts thereof and a liquid, and a positive gas flow pressure,
b) shearing the hop in said liquid, thereby forming a hop slurry,
c) passing the hop slurry through a hydrodynamic cavitation unit, whereby hop aromas are extracted,
d) optionally repeating steps (b) and/or (c) a plurality of times, whereby a hop aroma extract is produced.

In a preferred embodiment, said method is configured to be carried out in the hop aroma extraction unit according to the invention.

The invention also provides methods of producing a beer product, comprising the steps of:
a) preparing a hop aroma extract by a method of producing a hop aroma extract according to the invention,
b) adding the hop aroma extract prepared in step (a) to a fermented wort or a green beer.

In a preferred embodiment, the method for producing a beer product is configured to be carried out in any of the systems for producing a beer product according to the invention.

A further aspect of the invention relates to an aroma extraction unit, comprising:
- a hydration tank containing a mixture of plants or parts thereof and a liquid, said tank configured to contain a positive gas flow pressure,
- a shearing unit configured for shearing the plants or parts thereof,
- a hydrodynamic cavitation unit, and at least one circulation unit, wherein the hydration tank, shearing unit, cavitation unit are in fluid communication, and the at least one circulation unit is configured for circulating the mixture from the tank into the shearing unit, further into the cavitation unit, and from the cavitation unit back into the tank and/or shearing unit.

The invention furthermore provides systems for producing a beverage product, comprising:
- a beverage feed,
- the aroma extraction unit according to previous aspect,
- at least one pumping unit, wherein the container and extraction unit are in fluid communication, and the at least one pumping unit is configured as transfer means.

In a preferred embodiment, the container, and extraction unit are in continuous fluid communication. Most preferably, the fermentation container, and extraction unit are in partial continuous fluid communication.

The invention also provides methods of producing an aroma extract, comprising the steps of:
a) providing a container containing a mixture of plant or parts thereof and a liquid, and a positive gas flow pressure,
b) shearing the plant in said liquid, thereby forming a plant slurry,
c) passing the plant slurry through a hydrodynamic cavitation unit, whereby plant aromas are extracted,
d) optionally repeating steps (b) and/or (c) a plurality of times, whereby a plant aroma extract is produced.

In a preferred embodiment, said method is configured to be carried out in the aroma extraction unit according to the previous aspect.

The invention also provides methods of producing a beverage product, comprising the steps of:
a) preparing an aroma extract according to the previous aspect,
b) adding the aroma extract prepared in step (a) to a beverage feed.

The invention also provides methods of producing a beverage product, comprising the steps of:
a) providing a beverage feed,
b) splitting the beverage feed into a first volume fraction and a second volume fraction,
c) mixing the first volume fraction with plants or parts thereof within a container under a positive gas flow pressure, thereby forming a mixture,
d) subjecting said mixture to at least one cycle of shearing and cavitation, thereby forming an aroma extract,
e) discharging and mixing at least part of the aroma extract with the second volume fraction, whereby a beverage product is produced.

In a preferred embodiment, the process is continuous, such that the first volume fraction in step (b) is essentially equal to the discharged aroma extraction volume of step (e).

In a preferred embodiment, the methods for producing a beverage product is configured to be carried out in any of the systems for producing a beverage product according to the invention.

A further aspect of the disclosure relates to a hop extract or beer product comprising equal to or above 25 µg/L myrcene, equal to or above 190 μg/L linalool, and equal to or below 42 μm/L B-citronnellol.

In a preferred embodiment, the hop extract or beer product comprises equal to or above 50, 100, or 150 μg/L myrcene, and equal to or above 200, 205, 210, or 215 μgL/L linalool, and equal to or below 15, 14, 13, or 12 μg/L B-citronnellol.

DESCRIPTION OF DRAWINGS

The invention will in the following be described in greater detail with reference to the accompanying drawings.

FIGS. 5A and 5C are exemplified rotors, and FIGS. 5B and 5D are exemplified stators.

DETAILED DESCRIPTION OF THE INVENTION

Figure 1:
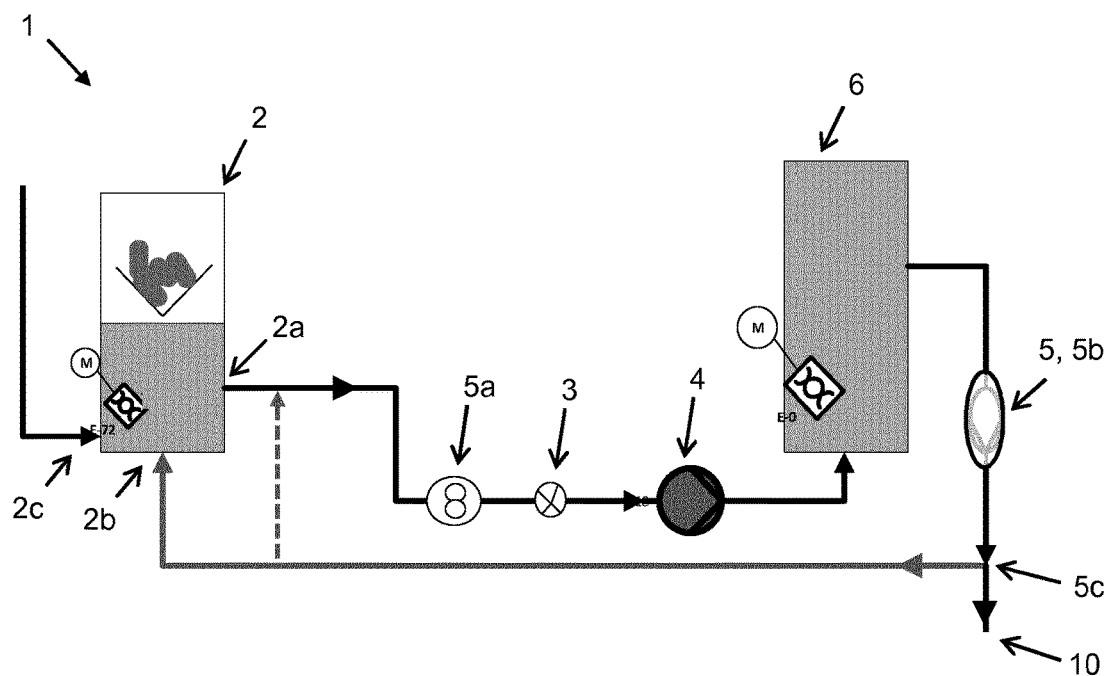
FIG. 1 shows an embodiment of a hop aroma extraction unit according to the present disclosure.

The invention is described below with the help of the accompanying figures. It would be appreciated by the person skilled in the art that the same feature or component of the device is referred with the same reference numeral in different figures. A list of the reference numbers can be found at the end of the detailed description section.

In the following, the embodiment are mainly exemplified based on hop extraction. However, the skilled person will know that the following may be extended to any aroma extraction.

Definitions

The term "approximately" when used herein in relation to numerical values preferably means±10%, more preferably ±5%, yet more preferably ±1%.

By the term "plant" is meant a plant or parts thereof, which may further have been subjected to a treatment, such as drying, roasting, withering, oxidation, curing, and/or fermentation. Examples of plant parts include plant leaf, blade, bud, stem, root, and fruits or cereal. Examples of plants and parts thereof are hops, dried malt, oranges, dried orange peel, green tea, and ginger.

By the term "hops" is meant a plant of the species *Humulus lupulus*. The term "hops" may refer to the entire hop plant or to parts thereof. Thus, "hops" may be a hop plant, hop leaves, hop cones or other parts of the hop plant. Frequently, "hops" as used herein refers the leaves and cones of the hop plant.

By the term "hop pellets" or "dry hop pellets" are meant dried hop material, which have been milled into a uniform powder and pressed through a pellet die. The milling may preferably be done by hammer-milling. The dried hop material comprises or may even essentially consist of hop leaves and/or cones. Hop pellets retain all of their natural hop oils, and can be used as a replacement for whole hops. Hop pellets are advantageous for transport, and shelf storage.

By the term "green beer" is meant a fermented wort, comprising up to 12 vol. % alcohol, and wherein at least 70% of the solids from the fermented wort has been removed. The solids from a fermented wort include mainly include yeast, but may also comprise other solids e.g. hops particles. Thus, green beer typically comprises at the most 30% of the yeast comprised in freshly fermented wort.

By the term "wort" is meant a liquid extract of malt and/or cereal kernels, such as milled malt and/or milled cereal kernels and optionally additional adjuncts. Wort is in general obtained by mashing and optionally sparging. Mashing is a controlled incubation of milled malt and/or milled cereal kernels and optionally additional adjuncts in water.

Mashing is preferably performed at specific temperature (s), and in a specific volume of water. Mashing may optionally be followed by "sparging", a process of extracting residual sugars and other compounds from spent grains after mashing with hot water. Sparging is typically conducted in a lauter tun, a mash filter, or another apparatus to allow separation of the extracted water from spent grains. The wort obtained after mashing is generally referred to as "first wort", while the wort obtained after sparging is generally referred to as the "second wort". If not specified, the term wort may be first wort, second wort, or a combination of both.

Extraction Unit

FIG. 1 shows an embodiment of a hop aroma extraction unit 1 according to the present disclosure. The unit is seen to comprise a hydration tank 2, a shearing unit 3, and a hydrodynamic cavitation unit 4, connected to be in fluid communication, and at least one circulation unit 5 configured for driving a circulating medium between the tank, shearing unit, and cavitation unit.

Tank

The unit comprises a hydration tank 2, wherein the plant, plant parts, hops, or hop pellets, to be extracted are introduced, together with a liquid for hydrating the plant/hops, thereby forming a mixture of solids and liquid.

By the term "hydration tank" is meant a tank, container or chamber, adapted for wetting a solid with a liquid. Thus, a hydration tank may also be referred to as a "wetting tank" or "mixing vessel". The liquid advantageously comprises water, such that the solid is at least partially hydrated during the wetting process.

The tank is configured to contain a positive gas flow pressure. By the term "gas flow pressure" is meant that the gas flow through the tank is adapted to maintain a positive gas pressure within the tank. For example, a positive $CO_2$ gas pressure of e.g. approximately 0.5 bar may initially be imposed to the tank, and subsequently an additional $CO_2$ flow through the tank is provided, such that the pressure within the tank is maintained, while a constant amount of gas flows into and out of the tank. This configuration may ensure that it is possible to control the amount and type of incoming gasses.

The fluid communication between the tank, shearing unit, and cavitation unit is advantageously facilitated through one or more port(s) or opening(s) within the tank. As illustrated in FIG. 1, the tank advantageously comprises at least one port 2a configured such that the mixture is able to circulate into and out from the tank via the port. For example, the mixture from the hydration tank may be discharged from the tank through the port, and optionally the mixture from the cavitation unit may be introduced into the tank through the port. However to improve the simplicity of the mixture flow pattern, the tank advantageously comprises a second port 2b configured to receive the mixture from the cavitation unit, as illustrated in FIG. 1.

In an embodiment of the disclosure, the tank comprises at least one port 2a configured such that the mixture is able to circulate into and out from the tank via the port. In a further embodiment, the tank comprises a second port 2b configured to receive the mixture from the cavitation unit.

To facilitate simple and easy supply of plants/hops and liquid to the tank, the hydration tank advantageously comprises an opening configured for supplying plants/hops or parts thereof to the tank. Preferably the hops are supplied in the form of dry hop pellets. Further advantageously, the tank comprises a third port 2c configured for supplying liquid to the tank, as illustrated in FIG. 1.

In an embodiment of the disclosure, the tank comprises an opening configured for supplying plants/hops or parts thereof to the tank. In a further embodiment, the hops are in the form of dry hop pellets.

In an embodiment of the disclosure, the tank comprises a third port 2c configured for supplying liquid to the tank.

Once hops and liquid has been supplied to the tank, the tank may be closed in order to ensure the positive gas flow pressure.

The tank may be equipped with a mixing unit, which can facilitate the mixing of the hops and the liquid. This may facilitate hydration of hops, e.g. hydration of hop pellets.

Figure 3:
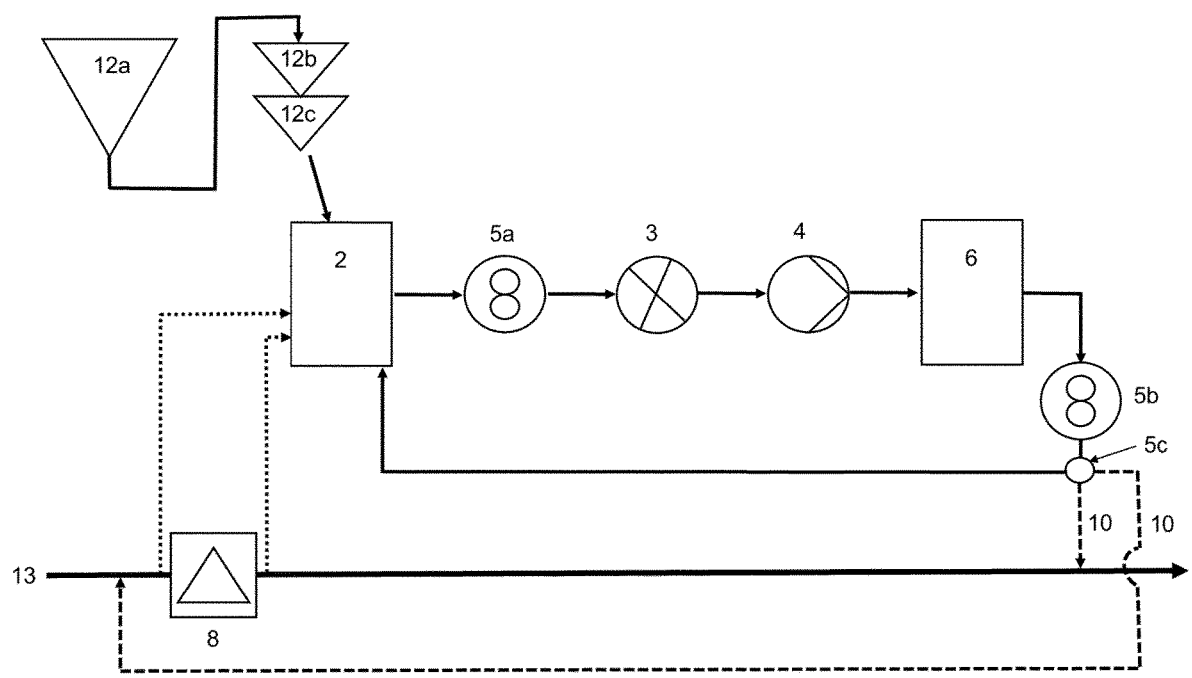
FIG. 3 shows an embodiment of an aroma extraction system (upper part), and an embodiment of the implementation within a system for producing a beer according to the present disclosure, comprising multiple hopper units.

Preferably, the plants, hops, or parts thereof are supplied to the mixing vessel 2 via one or more hopper units 12. The upper part of FIG. 3 shows an embodiment of an aroma extraction unit according to the present disclosure, where the plants/hops are supplied via three hopper units 12a-c.

A hopper unit is a container or chamber or reservoir, which is typically funnel-shaped or tapered, such that it is adapted for discharging solid bulk material contained in the container under e.g. gravity. Examples of solid bulk materials are hops or parts thereof, plants, plants parts, fibers, particles, sand, rocks, and other types of loose bulk materials.

Advantageously, one or more of the hopper units are adapted for discharging the solid bulk materials into a pneumatic system, such as the pneumatic mixing vessel 2.

As described above, the mixing vessel or hydration tank is advantageously pneumatic or pressurized, e.g. by a positive $CO_2$ gas pressure, to reduce the risk of oxidation of the hop mixture and hop aromas. Further advantageously, the mixing vessel is not manually opened when supplied with plants/hops. Manual opening of a container comprising $CO_2$ is subject to both personnel and environmental health and safety risks, as high concentrations of $CO_2$ is hazardous to humans. Furthermore, supply of solid particles, such as plants/hops, to a liquid comprising dissolved gasses, such as carbonated liquid, may result in an explosive $CO_2$ release under atmospheric pressure, as the skilled person knows from the similar situation occurring when mixing Mentos and cola. An explosive $CO_2$ release is also subject to personnel and environmental health and safety risks.

Hopper discharge into a pneumatic system may be obtained by use of vacuum and/or pressure valves. For example, the bulk solids may be discharged or transferred from the hopper unit by use of vacuum, e.g. the bulk of hopper unit 12a in FIG. 3 may be discharged by being sucked out of the hopper unit with vacuum, and also transferred into hopper unit 12b by the vacuum. Alternatively, or in addition, the bulk solids may be discharged from a second hopper unit with a first pressure, through a pressure valve and into a third hopper unit with a second pressure. For example, the bulk of hopper unit 12b in FIG. 3 may be discharged through a pressure valve into hopper unit 12c, where the second hopper unit contains atmospheric pressure or vacuum, and the third hopper unit is pneumatic or pressurized. The second hopper unit may also be referred to as the "gate hopper unit", and the third hopper unit may be referred to as the "dosing hopper unit". Thus, by use of vacuum and/or valves, the hopper units are adapted for feeding or discharging the solid bulk materials into a pneumatic system.

The transfer from the hopper unit(s) 12c and into the mixing vessel 2 may be obtained by gravity within the pressurized system. To further facilitate the transfer from the hopper unit(s) 12c and into the mixing vessel 2 within the pressurized system, and hence increase the production rates, the unit may further comprise one or more bulk material transport means, such as a screw conveyor, for transferring.

In an embodiment of the disclosure, the aroma extraction unit comprises one or more hopper units. In a further embodiment, the one or more of the hopper units are adapted for discharge into a pneumatic system, such as the pneumatic hydration tank. In a further embodiment, the one or more hopper units comprise vacuum transfer means and/or one or more pressure valve(s).

In a preferred embodiment of the disclosure, the extraction unit comprises three hopper units, wherein at least one of the hopper units comprises vacuum transfer means, and at least one of the hopper units comprises a pressure valve.

In another and further embodiment, the extraction unit comprises one or more bulk material transport means, such as a screw conveyor.

Another advantage of the hopper units being configured for discharge into a pneumatic system, is that the detrimental oxygen uptake into the pressurized system is significantly reduced and/or eliminated. Thus, the degree of oxidation of the hop mixture and hop aromas within the extraction unit is reduced.

Example 3 describes an example where an extraction unit was operated with and without a hopper unit. The unit without a hopper unit corresponded to the extraction unit embodied in FIG. 1, and the unit with a hopper unit corresponded to the extraction unit embodied in FIG. 3. Upon measuring the oxygen uptake inside the hydration tank, a significant reduction was observed for the setup including hopper units.

Circulation Unit

By means of the circulation unit, the mixture of plants/hops and liquid is transferred, sequentially or continuously, from the tank and to the shearing unit, and from the shearing unit to the cavitation unit, and from the cavitation unit back into the tank and/or the shearing unit, as indicated by the arrows in FIG. 1, from where the circulation through the combined shearing unit and cavitation unit may be repeated any number of times. Thus, one circulation cycle is defined as a circulation through the combined shearing unit and cavitation unit. Thus, the cavitation unit is placed downstream to the shearing unit, and the shearing unit is placed downstream to the tank, and upstream to the cavitation unit. Thus, after one circulation cycle, the mixture of plants/hops and liquid may be referred to as being "partly cavitated", and upon further circulation cycles, the mixture may be referred to as being "further cavitated".

Following a circulation cycle, all or a part of the mixture may be removed at a flow outlet 10 as indicated in FIG. 1. Thus, either partly cavitated or further cavitated mixture may be removed/discharged at the flow outlet. To reduce the number of parts, and the complexity of the unit, the flow outlet is a part of a flow direction controller 5c, having a first position forming a closed loop for circulation, and a second position wherein at least part of the mixture is removed at a flow outlet.

In an embodiment of the disclosure, the circulation unit further comprises a flow direction controller 5c having a first position forming a closed loop for circulation, and a second position wherein at least part of the mixture is removed at a flow outlet 10. In a further embodiment, the circulation unit further comprises a flow direction controller 5c having a first position forming a closed loop for circulation between the tank, shearing unit, and cavitation unit, and a second position wherein at least part of the mixture is removed after the cavitation unit at a flow outlet 10.

Thus, when the flow direction controller is in the first position, a closed loop of circulation is formed between the tank, shearing unit, cavitation unit, and back into the tank. Alternatively after the first cycle, the mixture may be circulated back into the shearing unit instead of the tank, such that a second closed loop of circulation is formed between the shearing unit, cavitation unit, and back into the shearing unit. In both cases, the circulation may be configured to be sequentially or continuously.

In an embodiment of the disclosure, the at least one circulation unit is configured for circulating the mixture from the tank into the shearing unit, further into the cavitation unit, and from the cavitation unit back into the tank and/or shearing unit.

For efficient circulation, and to avoid clogging in the unit, the circulation unit advantageously comprises two or more circulation units. Further advantageously, a first circulation unit 5a is configured for circulating the mixture from the tank into the shearing unit, e.g. by being placed between the tank and the shearing unit, as indicated in FIG. 1, and the second circulation unit 5b is configured for circulating the mixture from the cavitation unit back into the tank and/or shearing unit, e.g. by being placed after the cavitation unit, as indicated in FIG. 1. Optionally, the circulation units are selected from the groups of pumps and booster pumps, where a booster pump is adapted for increasing the pressure of the pumped media. To improve the efficiency of the circulation, the first circulation unit is advantageously a pump, and the second circulation unit is a booster pump.

In an embodiment of the disclosure, the unit comprises a first and a second circulation unit, wherein the first circulation unit 5a is configured for circulating the mixture from the tank into the shearing unit and further into the cavitation unit, and wherein the second circulation unit 5b is configured for circulating the mixture from the cavitation unit back into the tank and/or shearing unit. In a further embodiment, the first circulation unit is a pump, and the the second circulation unit is a booster pump.

To improve and control the efficiency of the circulation, the unit advantageously comprises one or more flow meters. For example, the unit may comprise a flow meter placed between the first and second circulation unit, e.g. between the cavitator 4 and cavitation tank 6. In an embodiment of the disclosure, the unit comprises one or more flow meters.

Shearing Unit and Cavitation Unit

During extraction, aroma substances are extracted from the plants/hops or parts thereof and into a surrounding liquid phase. Thus, by the term "plant/hop aroma extract" is meant a mixture of plants/hops or parts thereof and liquid, wherein substances from the solid plants/hops are extracted to the liquid phase. It was found that exposing the wetted or hydrated plants/hops, or parts thereof, to a combined shearing unit and cavitation unit, resulted in a surprisingly efficient extraction of the plant/hop aromas, as well as a surprisingly selective extraction of the more tasteful aromas or substances.

Example 1 describes an example of a hop aroma extract produced according to the present disclosure, where a surprisingly efficient and selective extraction was obtained.

Hop aromas which may be extracted from the hop and into a surrounding liquid include, but are not limited to: isobutyl isobutyrate, myrcene, isoamyl isobutyrate, limonene, linalool, citronellyl acetate, a-humulene, a-terpineol, geranyl acetate, B-citronnellol, geraniol. Examples of the more tasteful aromas include the substances: myrcene and linalool. An example of a less relative tasteful aroma include B-citronnellol.

Figure 5:
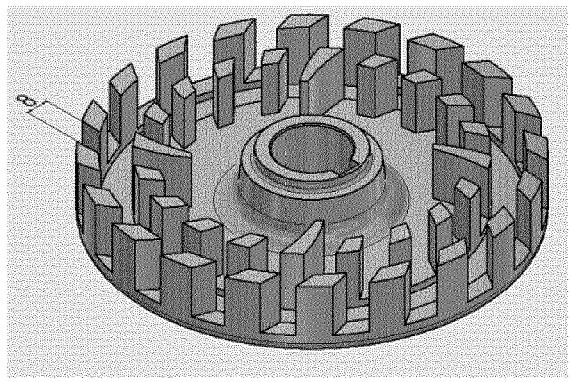
FIG. 5 shows examples of rotor-stator stems.
Figure 5:
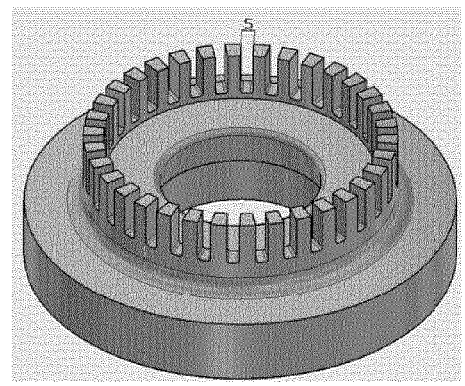
Figure 5:
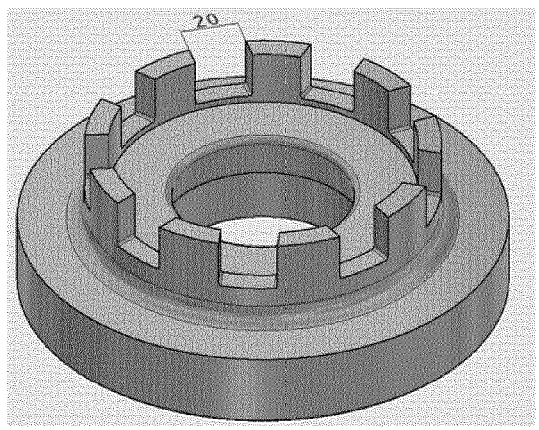
Figure 5:
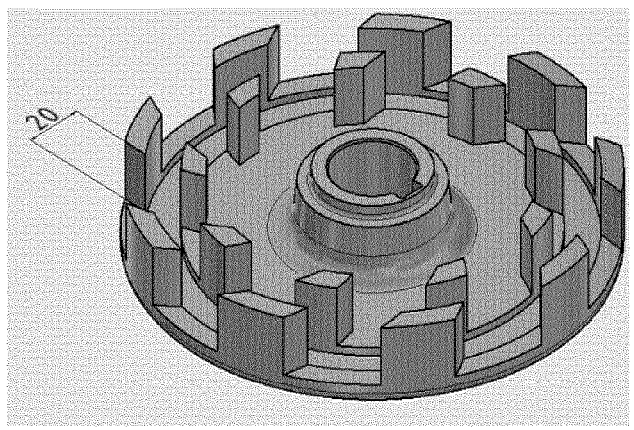

By the term "shearing unit" is meant a unit exposing a medium to shear forces, i.e. forces acting coplanar with a cross section of the medium. A medium, such as a suspension comprising solids dispersed in a liquid, may be exposed to shear forces by passing the suspension through a rotor-stator-system. A rotor-stator-system consists of a series of parallel discs placed spaced apart and in-line, and where every other disc is rotating, and every other disc is static. The suspension is forced through the rotor-stator-system in a direction perpendicular to the discs, and by passing the alternately rotating and static disc, the suspension is subjected to shearing forces. Thus, the shearing unit subjects the suspension to shearing forces, which are effective at an essentially constant pressure. An example of a shearing unit, which is a rotor-stator-system is a YTRON-Z homogenizer. Examples of rotor-stator systems are shown in FIG. 5, where the rotor-stator system is characterized as a disc with a predefined diameter, and having teeths extending radially from the plate and spaced with predefined distance from each other, corresponding to slots. FIGS. 5A and 5C are exemplified rotors, and FIGS. 5B and 5D are exemplified stators. Particular advantageous shearing of the hop/plant was found to be obtained with a rotor-stator having a diameter of about 100-160 mm, more preferably about 120-140 mm, and most preferably about 130 mm. Further advantageous shearing was found to be obtained with a rotor having teeths spaced 5-50 mm apart, more preferably spaced 7-30 mm apart, such as spaced 8 mm or 20 mm apart. Further advantageous shearing was found to be obtained with a stator having teeths spaced 2-40 mm apart, more preferably spaced 4-30 mm apart, such as spaced 5 mm or 20 mm apart. Particularly advantageous shearing was found to be obtained with a rotor having teeths spaced 5-50 mm apart, in combination with a stator having teeths spaced 2-40 mm apart, for example a rotor having teeths spaced 8 mm apart in combination with a stator having teeths spaced 5 mm apart, or a rotor having teeths spaced 20 mm apart in combination with a stator having teeths spaced 20 mm apart.

As illustrated in FIG. 1, the mixture of hops and liquid is passed through the shearing unit one or more times. In the shearing unit, the mixture is homogenized, and the shearing unit may further result in milling of the plant/hop particles, thereby reducing the particle size of the plants/hops or parts thereof. As described above, the shearing unit subjects the suspension to shearing forces, which are mechanically generated, and inherently subjects the suspension to an essentially constant pressure. Due to the mechanical movements, the mechanically generated shearing forces may provide an efficient particle size reduction. This is in contrast to the cavitation unit, which is not operating by mechanical movements and essentially constant pressure, and therefore the cavitation unit is not an effective particle size reducer, as further described below.

The reduced plant/hop particle sizes and the improved homogenization or dispersion of the particles, causes an increased surface area contact between the solid particles and the surrounding liquid. The increased contact surface area may facilitate an improved aroma extraction process in the subsequent cavitation unit. For a plant/hop mixture exposed to a shearing unit, the particle size is finer and the dispersion of the particles are more uniform, and the viscosity high, and the suspension may be referred to as a "plant/hop slurry", having the similar physical properties as mud or cement.

In an embodiment of the disclosure, the shearing unit is a rotor-stator-system for obtaining shear forces in the mixture. In a further embodiment, the rotor-stator system has a diameter of about 100-160 mm, more preferably about 120-140 mm, and most preferably about 130 mm. In a further embodiment, the rotor comprises teeths spaced 5-50 mm apart, more preferably spaced 7-30 mm apart, such as spaced 8 mm or 20 mm apart. In a further embodiment, the stator comprises teeths spaced 2-40 mm apart, more preferably spaced 4-30 mm apart, such as spaced 5 mm or 20 mm apart.

It was surprisingly found that a plant/hop slurry, where the particles of the plant/hops or parts thereof have a certain size, provided improved aroma extraction efficiency and selectivity, in combination with improved processability. By the term "processability" is meant the ability to process the particles, e.g. to separate and/or filtrate the particles, e.g. separating solids from liquid phase or filtrating a certain particle range. Hence, particle sizes with poor processability are prone to agglomeration, filter/separator clogging, whereas particle sizes with good processability are easy to separate and/or filtrate without risking clogging of the filter or separation unit.

For improved aroma extraction efficiency, selectivity and processability, it was surprisingly found that a particle size distribution (PSD), where the majority of the particles were between 1-100 μm, or preferably between 8-100 μm were advantageous.

Figure 4:
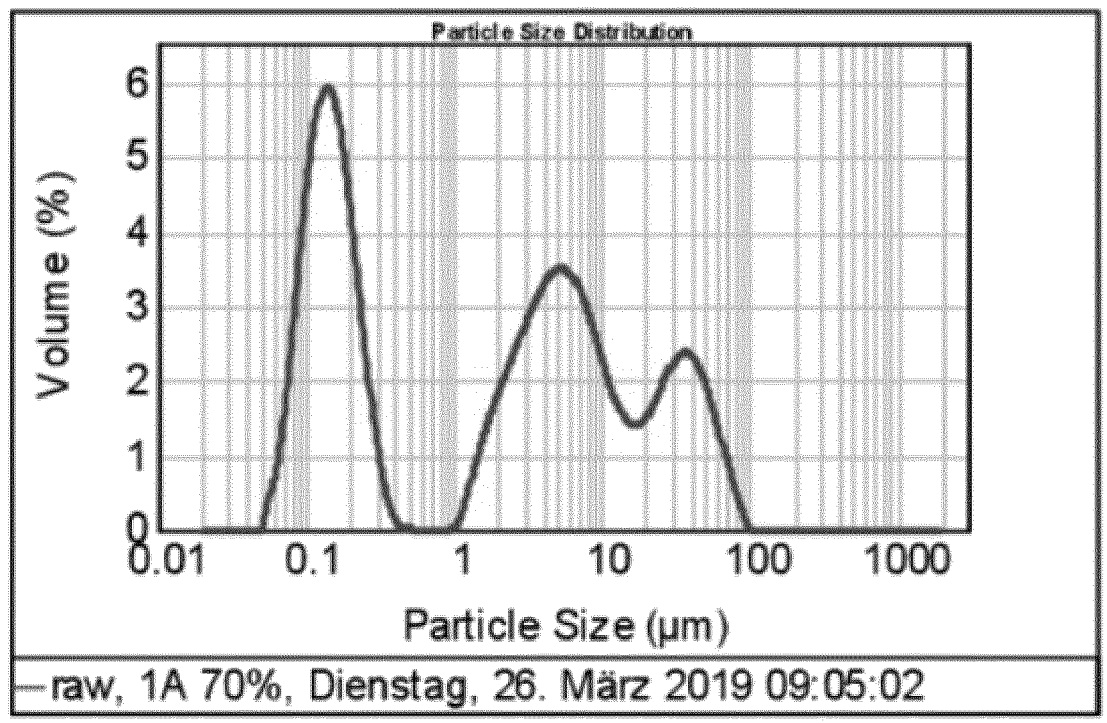
FIG. 4 shows an embodiment of a particle size distribution obtained upon exposure to a shearing unit according to the present disclosure.
Figure 4:
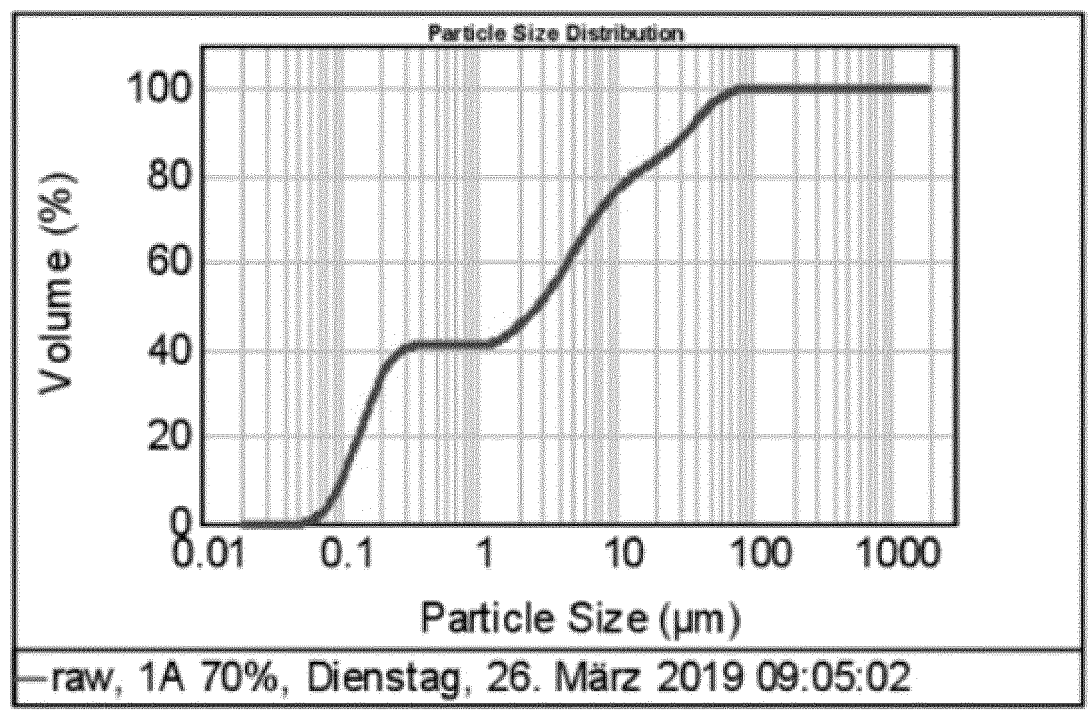

An example of such a particle size distribution of a plant/hop slurry obtained after a shearing unit is shown in FIG. 4. The PSD is seen to be a trimodal particle size distribution with a first peak around a characteristic particle diameter of 0.1-0.2 μm, a second peak around a characteristic particle diameter of 1-10 μm, and a third peak around a characteristic particle diameter of around 20-100 μm. Particularly, it is seen that below 40 vol % of the particles have a particle size below 0.2 μm.

It was observed that the higher the fraction of particles between 1-100 μm, the higher the aroma extraction efficiency, selectivity and processability.

The obtained particle size distribution will be determined by the operation parameters of the shearing unit, including parameters such as pump speed, pump frequency, pump size, and rotor-stator design.

The particle size of a spherical particle is unambiguously defined by its diameter or radius. However, for most cases, the particle shapes are not spherical and the particles may differ in sizes and have a distribution of different sizes. Thus, when applying the common techniques as known to the skilled person for evaluating particle sizes, the particle size is often quantified in terms of a representative particle diameter or radius, such as the average particle diameter. Furthermore, the size of non-spherical particles may be quantified as the diameter of an equivalent sphere, such as the sphere having the same volume as the non-spherical particle, the sphere having the same surface area as the non-spherical particle, the sphere having the same sedimentation rate as the non-spherical particle, the sphere having a diameter corresponding to the length of the major axis (maximum length) of the non-spherical particle, or the sphere having a diameter corresponding to the minor axis (or minimum length) of the non-spherical particle. Despite this is not a proper quantification from a geometrical point of view, it is applied to provide a quantitative description of the characteristic sizes. In most cases, a particle size distribution exists, as seen in FIG. 4.

In FIG. 4, the particle size refers to the "characteristic particle diameter", which is the particle diameter of the equivalent spheric particle as evaluated by laser diffraction. This characteristic particle diameter and the associated particle size distributions are evaluated using laser diffraction, where the liquidly dispersed particles are passed through a focused laser beam, such that the particles scatter the light. The scattering angle is proportional to the particle size, and a map of the scattering intensity versus the angle may then be obtained and used to calculate the particle sizes and the distribution. The calculation of the particle size distribution may be based on Mie theory, which is based on assuming spherical particles. The Mie theory includes comparison of the obtained scattering pattern with scattering patterns derived from theory (assuming spherical particles).

The characteristic particle diameters of the present disclosure were evaluated using laser diffraction and Mie theory. Specifically, the characteristic particle diameters were evaluated using a Malvern MasterSizer 2000 (from Malvern Panalytical GmbH, Kassel, Germany).

Before and after each measurement, a cleaning step with distilled water and background measurement was carried out. Sample (plant or hop slurry) was loaded into the measurement cell to obtain an acceptable load (or obscuration value) to allow start of the measurement. Preferably the obscuration value was around 12%, such as 12.34%. The measurements were carried out using the following settings: Optical properties of the material to be measured: particle refractive index=1.59, absorption index=0.

Optical properties of the liquid or dispersant: refractive index=1.33.

Measurement time=12 seconds.

Each sample was measured once, with 12000 snaps, corresponding to 1000 snaps/sec.

In an embodiment of the disclosure, the shearing unit is configured for shearing at least 50 vol % of the plants or parts thereof into a charactistic particle diameter of between 1-100 μm, more preferably between 8-100 μm. In a further embodiment, the shearing unit is configured for shearing at least 55, 60, 65, 70, 75, 80, 85, 90, 95, or 99 vol % of the plants or parts thereof into a charactistic particle diameter of between 1-100 μm, more preferably between 8-100 μm.

In an embodiment of the disclosure, the shearing unit is configured for shearing the plant/hop into a trimodal particle size distribution (PSD). In a further embodiment, the characteristic particle diameter of the first peak is 0.1-0.5 μm, more preferably 0.1-0.2 μm, the characteristic particle diameter of the second peak is 1-10 μm, more preferably 2-5 μm, and the characteristic particle diameter of the third peak is 10-100 μm, more preferably 20-50 μm.

By the term "hydrodynamic cavitation unit" is meant a unit exposing a liquid or suspension to hydrodynamic cavitational forces. Cavitational forces is produced by subjecting a liquid or suspension to rapid changes of pressure that cause the formation of cavities or voids in the liquid, where the pressure is relatively low, and implosion of the voids when subjected to higher pressure. The voids implosion can generate an intense shock wave. The cavitational forces may be produced by non-inertial cavitation or inertial cavitation. Non-inertial cavitation is based on voids or bubbles oscillating in size or shape due to an energy input, such as ultrasound. In contrast, the voids are generated mechanically for inertial cavitation, e.g. by passing the liquid through a constricted channel at a specific flow velocity, or by mechanically rotation of an object within the liquid. Inertial cavitation may also be referred to as hydrodynamic cavitation. An example of a hydrodynamic cavitation unit is a ShockWave Xtractor™ from Hydro Dynamics, Inc.

The shock waves generated by cavitational forces are inherently different to the shearing forces generated by the shearing unit. Whereas the shearing unit subjects the suspension to shearing forces, which are mechanically generated, and inherently subjects the suspension to an essentially constant pressure, the cavitation unit inherently subjects the suspension to high pressure changes or fluctuations. The pressure changes are more than ten-fold, such as twenty-fold, thirty-fold, forty-fold, fifty-fold, sixty-fold, seventy-fold, or eighty-fold, and preferably more than ninety-fold, or one-hundred-fold, and most preferably more than two-hundred-fold, such as three-hundred fold. Further preferably, the pressure changes or fluctuations occur over short periods of time or with short time intervals, e.g. within less than 10 minutes, such as 5 minutes or 2 minutes, and preferably within less than 60 seconds, such as 30, 10 seconds, and most preferably within less than 1 second, such as less than 100 microseconds, 10 microseconds, 1 microsecond, 100 nanoseconds, 10 nanoseconds, or less than 1 nanosecond.

Since the operation of the cavitation unit is based on pressure fluctuation and not mechanical movements, the cavitation unit is not an effective particle size reducer. This is because a particle exposed to a pressure wave, e.g. in the form of a shock wave, will react differently compared to when exposed to a shearing force between two parallel plates, such as a rotor and stator. For example, a particle exposed to pressure waves may be more prone to volume reduction by compression and elastic deformation of the solid particle, whereas a particle exposed to a shearing force may be more prone to volume reduction by being torn or split apart into two or more particle parts.

In an embodiment of the disclosure, the shearing unit is configured to operate at an essentially constant pressure, and the cavitation unit is configured to operate at operate with more than ten-fold pressure changes, preferably more than fifty-fold pressure changes, and most preferably more than one-hundred fold pressure changes.

In a further embodiment, the pressure changes occur with time intervals of less than 10 minutes, more preferably less than 10 seconds or 1 second, such as 100 nanoseconds, 10 nanoseconds, or less than 1 nanosecond.

As illustrated in FIG. 1, the mixture of hops and liquid is passed through the combined shearing unit and hydrodynamic cavitation unit one or more times.

Subjecting the mixture to cavitational forces is seen to promote the extraction of the hop aromas. Surprisingly efficient extraction and selectivity may be obtained by exposing the mixture to hydrodynamic cavitational forces, particularly when the hop particles are well-dispersed and the particle size reduced by a shearing unit, as exemplified in Example 1.

In an embodiment of the disclosure, the cavitation unit is configured for producing shock waves and pressure variations in the mixture.

Further advantageously, the extraction unit or parts thereof are operated at low temperatures, such as a temperature below 25° C. Surprisingly efficient and selective extraction was observed, when the shearing unit and/or the cavitation unit were operated at a low temperature, such as 40C as described in Example 1.

In an embodiment of the disclosure, the shearing unit and/or the cavitation unit are configured to operate at a temperature below 25° C., such as in the range of 1-15° C. or in the range of 2-10° C., and preferably at approximately 4° C.

Gas

To avoid risk of oxidation of the hop mixture and hop aromas, the extraction unit is advantageously sealed towards the surroundings during operation to prevent ingression of air. Further advantageously, the unit comprises inert or non-oxidative gasses, which may be introduced or filled into the unit before use, and optionally during use. Examples of an inert or non-oxidative gas for a hop mixture include: $CO_2$, $N_2$, and combinations thereof.

For example, the hydration tank may be filled with an inert or non-oxidative gas before use, and further configured to contain a positive gas flow pressure during use. Thus, only the inert or non-oxidative gas will be present in the unit during use. To further reduce the risk of air ingression and accidental oxidation of the mixture, the gas is filled into the tank such that a positive pressure or a gas overpressure is obtained. Advantageously, the overpressure is above 0.1 bar, such as in the range of 0.1 to 1.5 bar, for example in the range of 0.2 to 1.5 bar, for example approximately 0.2, 0.4, 0.5, 0.7, 1, 1.5 bar.

In an embodiment of the disclosure, the gas is selected from the group of: $CO_2$, $N_2$, and combinations thereof. In a preferred embodiment the gas is $CO_2$. In a further embodiment, the positive gas flow pressure is above 0.1 bar, such as in the range of 0.1 to 1.5 bar, for example in the range of 0.2 to 1.5 bar, for example approximately 0.2, 0.4, 0.5, 0.7, 1, 1.5 bar.

The higher the gas flow pressure, the more complex and energy consuming the unit. It was found that the risk of air ingression into the mixture, may be further reduced even at a low gas flow pressure, when the gas flow occurred above and across the hop mixture, i.e. across the top of the tank. The gas flow thereby purges the tank, while the gas flow forms a gas layer above and across the surface of the hop mixture, in the same manner as an air blanket or an air curtain.

In an embodiment of the disclosure, the gas is a purging gas. In a further embodiment, the gas is configured to flow at the top of the tank.

To further reduce the risk of ingression of air into the extraction unit, and oxidation of the mixture, the unit may comprise a cavitation tank 6 as illustrated in FIG. 1. By the term "cavitation tank" is meant a tank, container, or chamber configured for containing the mixture after it is discharged from the cavitation unit. Advantageously, the cavitation tank may be filled with an inert or non-oxidative gas before use, and further configured to contain a positive gas flow pressure during use, in the same manner as the hydration tank.

In an embodiment of the disclosure, the unit further comprises a cavitation tank 6 configured for containing the mixture after the cavitation unit. The cavitation tank is also referred to as a buffer tank. In a further embodiment, the cavitation tank is configured to contain a positive gas flow pressure. In a further embodiment, the gas is selected from the group of: $CO_2$, $N_2$, and combinations thereof, and/or wherein the positive gas flow pressure is above 0.1 bar, such as in the range of 0.1 to 1.5 bar, for example in the range of 0.2 to 1.5 bar, for example approximately 0.2, 0.4, 0.5, 0.7, 1, 1.5 bar, and/or wherein the gas is a purging gas, and/or configured to flow at the top of the cavitation tank.

The size of the buffer tank determines the capacity of the extraction unit. For optimized hop extraction for production of beer products, the size is advantageously 20-70 hL. In an embodiment of the disclosure, the cavitation tank has a capacity of 20-70 hL, more preferably 30-50 hL, such as 40 hL.

Liquid

The aroma extraction efficiency and selectivity will depend on the liquid used for extraction. However, when the extracted aroma is intended for use in a beverage product, the liquid is advantageously said beverage product or a precursor to the beverage product, since this will improve the system efficiency.

Figure 2:
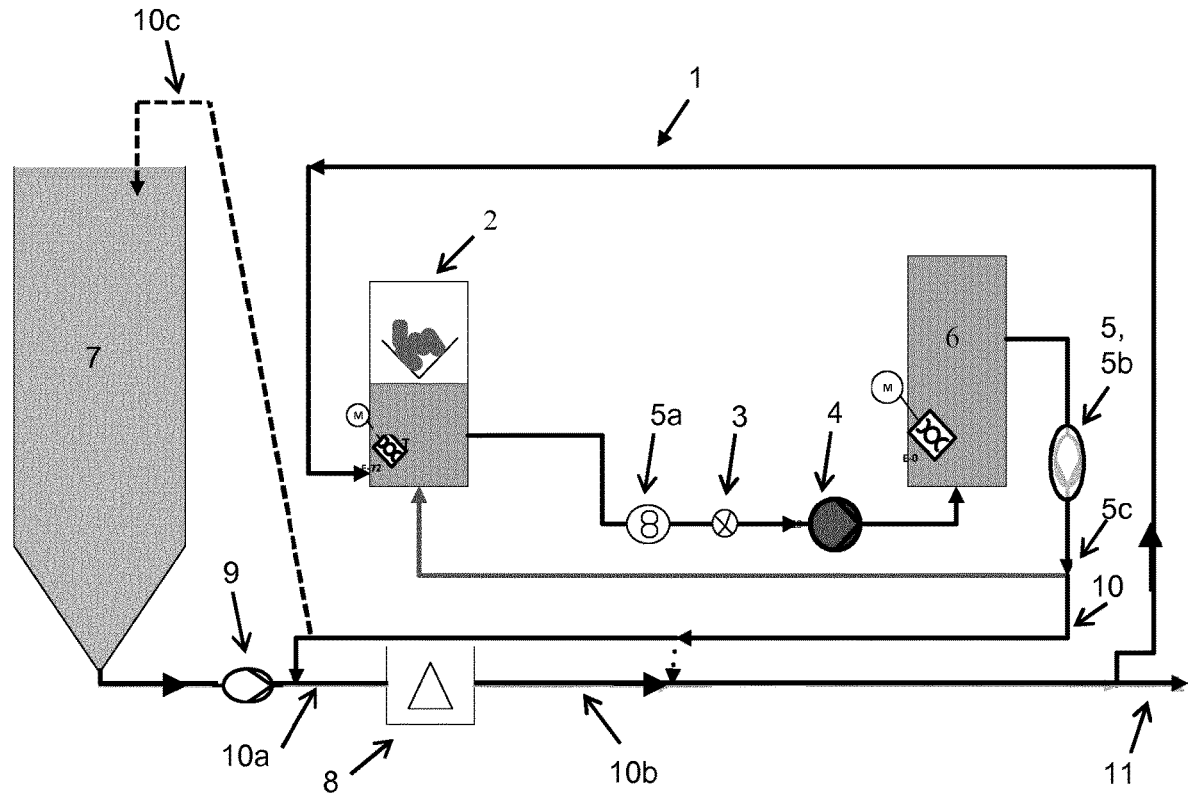
FIG. 2 shows an embodiment of a system for producing beer according to the present disclosure.

For example as illustrated in FIGS. 2 and 3, the liquid may be taken from a beer feed line 13. The beer feed may be wort taken before the separation unit 8 (as e.g. shown with dotted line in FIG. 3), or green beer taken after the separation unit, e.g. centrifuged green beer (as e.g. shown with dotted line in FIG. 3, or in FIG. 2). Thus, the liquid may be non-centrifuged, centrifuged, unfiltered, or filtered beer.

The hop extraction efficiency and selectivity will depend on the liquid used for extraction. Surprisingly efficient extraction and selectivity towards the more tasteful hop aromas was obtained using a liquid comprising between 0.5-12 vol % ethanol, for example in the range of 3 to 10 vol % ethanol, such as a green beer comprising in the range of 0.5 to 12 vol % ethanol, such as in the range of 3 to 10 vol % ethanol, for example in the range of 4 to 8 vol % ethanol, such as approximately 6 vol % ethanol. In one embodiment the liquid is green beer as described in Example 1.

Use of green beer as liquid further has the advantage that the amount of yeast is low. Thus, in green beer typically at least 70%, for example at least 80%, such as at least 90% of the solids present in the freshly fermented wort have been removed. Accordingly, green beer comprises at the most 30% of the yeast cells, such as at the most 20%, for example at the most 10% of the yeast cells comprised in freshly fermented wort. This means that a limited number of yeast cells are exposed to the cavitation unit. Exposing yeast cells to cavitational forces may result in breakdown of the yeast cells, and release of cellular yeast components that are detrimental for the taste. This may in particular be the case, if the liquid comprises a high level of yeast cells. A low concentration of yeast in the extraction liquid is therefore preferred.

Furthermore, the produced hop aroma extract based on such a liquid was observed to have a high affinity for mixing with fluids comprising alcohol.

To reduce the amount of raw materials used in the extraction process, the liquid may advantageously be recycled green beer. By the term "recycled green beer" is meant green beer exposed to more than one separation step, wherein at least 70% of the solids are removed. Thus, recycled green beer may also be referred to as further processed green beer.

In an embodiment of the disclosure, the liquid comprises between 0.5-12 vol % alcohol, more preferably between 3-10 vol %, such as approximately 5, 6, 7, 8, 9 vol %. In a further embodiment, the liquid is a green beer or recycled green beer.

The mixture of solid hops and liquid forms a suspension. The stability of the suspension, i.e. the dispersion and uniform distribution of the solid particles within the liquid, will depend on parameters such as the particle size, liquid viscosity and liquid turbulence. For a hops mixture exposed to a shearing unit, the particle size is finer and the dispersion of the particles are more uniform, and the viscosity high, and the suspension may be referred to as a slurry, having the same physical properties as mud or cement.

To improve the stability of the suspension, the unit may comprise one or more stirring means. An example of stirring means is a YTRON-Y jet stream mixer. To improve the stirring efficiency, the stirring means are advantageously placed in the hydration tank and/or cavitation tank.

In an embodiment of the disclosure, the hydration tank and/or cavitation tank comprises stirring means.

Extraction Method

The present disclosure provides a method of producing an aroma extract, and particularly a hop aroma extract. Advantageously, the method comprises the steps of:
  providing a container containing a mixture of hop or parts thereof and a liquid, and a positive gas flow pressure,
  shearing the hop, thereby forming a hop slurry,
  passing the hop slurry through a hydrodynamic cavitation unit, whereby hop aromas are extracted, and
  optionally repeating the shearing step and/or cavitation step a plurality of times, whereby a hop aroma extract is produced.

Advantageously the method is configured to be carried out in the extraction unit described above. Preferably the shearing step and the cavitation step is repeated a plurality of times, such as in the range of 1 to 5 times, for example 3 times.

For improved extraction efficiency and selectivity, the method is advantageously carried out using a preferred liquid, temperature, and number of repetitions of the cavitation step, as demonstrated in Example 1.

In an embodiment of the disclosure, the liquid is an unfiltered beer, such wort or green beer or recycled green beer or further processed green beer. In a further embodiment, the slurry is passed through the cavitation unit two or more times, such as three or four times. In a further embodiment, the method is carried out at a temperature below 25° C., such as between 1-15° C. or 2-10° C., and preferably at approximately 4° C.

The hop aroma extract obtained by the disclosed method was seen to comprise a surprisingly high sum of extracted components, as further described in Example 1. The extracted hop components further comprised a surprisingly high concentration of the more tasteful aromas, such as myrcene and linalool. Specifically, a high concentration of myrcene and linalool was seen in combination with a low concentration of B-citronnellol. Thus, the produced hop aroma extract has a composition and concentrations facilitating that only small volumes of the extract is needed for providing an tasteful beer. Thus, an equally tasteful beer may be obtained using an extract, produced from a smaller amount of hop raw material.

An aspect of the disclosure relates to a hop extract and a beer product comprising a high amount of myrcene and linalool, in combination with a low concentration of B-citronnellol.

In an embodiment of the disclosure, the hop extract or beer product comprising equal to or above 25 μg/L myrcene, and equal to or above 190 μg/L linalool, and equal to or below 42 μm/L B-citronnellol.

In a further embodiment, the hop extract or beer product comprises equal to or above 50 µg/L myrcene, such as equal to or above 100 µg/L myrcene or equal to or above 150 µg/L myrcene, and equal to or above 200 µgL/L linalool, such as equal to or above 205 µgL/L linalool, or equal to or above 210 µgL/L linalool, or equal to or above 215 µgL/L linalool, and equal to or below 15 µg/L B-citronnellol, such as equal to or below 14 µg/L B-citronnellol, or equal to or below 13 µg/L B-citronnellol, or equal to or below 12 µg/L B-citronnellol.

In an embodiment of the disclosure, the extract comprises a sum of extracted hop components between 200-1000 µg/l, more preferably between 400-600 µg/l, such as 466 or 551 µg/l. In a further embodiment, the extracted hop components comprises myrcene and/or linalool, and/or wherein the amount of extracted myrcene is between 10-500 µg/I, more preferably between 50-200 µg/I, such as 130 or 170 µg/I, and/or wherein the amount of extracted linalool is between 150-500 µg/I, more preferably between 180-250 µg/I, such as 190 or 215 µg/I. Aforementioned concentrations are preferably obtained using a ratio of hops to liquid of 6 kg dry hops per hL.

The extracted hop components further comprised a surprisingly high relative ratio of the more tasteful aromas, such as myrcene, linalool, and geraniol. For example, as seen in Table 1 of Example 1, the relative ratios of myrcene, linalool, and geraniol compared to limonene, citronnellyl acetate, and a-terpinol were much higher for the extracted hops according to the present disclosure (Cavihop trials 3C and 3D). For example, the ratio myrcene:limonene is 130:1 and 170:1 for the cavihop trials, and only 6:1 for the traditional extraction. Similarly, the ratio linalool:limonene is 215:1 and 190:1 for the cavihop trials, and only 120:1 for the traditional. Also, the ratio geraniol:limonene is much higher for the cavihop trials (81:1 and 69:1) than for the traditional (19:1). An overview of the ratios obtained in Example 1 are listed in the table below.

| Trial no. | Myrcene:Limonene | Linalool:Limonene | Geraniol:Limonene |
| --- | --- | --- | --- |
| 3A (traditional) | 6:1 | 120:1 | 19:1 |
| 3C (cavihop) | 170:1 | 215:1 | 81:1 |
| 3D (cavihop 20%) | 130:1 | 190:1 | 69:1 |

| Trial no. | Myrcene:Citronellyl acetate | Linalool:Citronellyl acetate | Geraniol:Citronellyl acetate |
| --- | --- | --- | --- |
| 3A (traditional) | 3:1 | 60:1 | 10:1 |
| 3C (cavihop) | 170:1 | 215:1 | 81:1 |
| 3D (cavihop 20%) | 130:1 | 190:1 | 69:1 |

| Trial no. | Myrcene:a-terpineol | Linalool:a-terpineol | Geraniol:a-terpineol |
| --- | --- | --- | --- |
| 3A (traditional) | 1:1 | 12:1 | 2:1 |
| 3C (cavihop) | 15:1 | 19:1 | 7:1 |
| 3D (cavihop 20%) | 12:1 | 17:1 | 6:1 |

An aspect of the disclosure relates to a hop extract and a beer product comprising a high relative ratio of myrcene, linalool, and geraniol compared to limonene, citronnellyl acetate, and a-terpinol.

In an embodiment of the disclosure, the hop extract or beer product comprises ratios of myrcene, linalool, and geraniol compared to limonene, above respectively 50:1, 150:1, and 40:1.

In a preferred embodiment, the myrcene:limonene ratio is above 50:1, more preferably above 100:1, and most preferably above 120:1, such as 130:1 or 170:1.

In a preferred embodiment, the linalool:limonene ratio is above 150:1, more preferably above 170:1, and most preferably above 180:1, such as 190:1 or 215:1.

In a preferred embodiment, the geraniol:limonene ratio is above 40:1, more preferably above 50:1, and most preferably above 60:1, such as or 69:1 or 81:1.

In an embodiment of the disclosure, the hop extract or beer product comprises ratios of myrcene, linalool, and geraniol compared to citronellyl acetate, above respectively 50:1, 100:1, and 40:1.

In a preferred embodiment, the myrcene:citronellyl acetate ratio is above 50:1, more preferably above 100:1, and most preferably above 120:1, such as 130:1 or 170:1.

In a preferred embodiment, the linalool:citronellyl acetate ratio is above 100:1, more preferably above 150:1, and most preferably above 180:1, such as 190:1 or 215:1.

In a preferred embodiment, the geraniol:citronellyl acetate ratio is above 40:1, more preferably above 50:1, and most preferably above 60:1, such as 69:1 or 81:1.

In an embodiment of the disclosure, the hop extract or beer product comprises ratios of myrcene, linalool, and geraniol compared to a-terpineol, above respectively 5:1, 15:1, and 4:1.

In a preferred embodiment, the myrcene:a-terpineol ratio is above 5:1, more preferably above 10:1, and most preferably above 11:1 such as 12:1 or 15:1.

In a preferred embodiment, the linalool:a-terpineol ratio is above 15:1, more preferably above 16:1, such as 17:1 or 19:1.

In a preferred embodiment, the geraniol:a-terpineol ratio is above 4:1, more preferably above 5:1, such as 6:1 or 7:1.

System for Producing Beer or Beverage

FIG. 2 shows an embodiment of a system for producing a beer product according to the present disclosure. The system comprises the hop aroma extraction unit according to the present disclosure, a fermentation container 7, and a separation unit 8 in fluid communication. The system further comprises at least one pumping unit 9 configured as a transfer means.

For example, the pumping unit may be configured for transferring the fermented wort from the fermentation container and into the separation unit, wherein the transfer may occur in a first transfer line 10a, as illustrated in FIG. 2. The separation unit may be configured to remove at least 70 wt % of the solids from the fermented wort, such that a the separation unit converts the fermented wort into a green beer.

The pumping unit may further be configured for transferring the green beer from the separation unit, and to a system outlet, wherein the transfer may occur in a second transfer line 10b. Optionally, the outlet further comprises a filtration unit 11, as illustrated in FIG. 2.

In an embodiment of the disclosure, the system further comprises a filtration unit 11.

The flow outlet of the hop aroma extraction unit is fluidly connected to either the first transfer line, the second transfer line, or the fermentation container 10c, as indicated in FIG. 2 by stipled lines, such that the hop aroma extract prepared in the unit, may be added to either a fermented wort, or a green beer. The multiple opportunities for adding the hop aroma extract, increases the flexibility of the production process.

In an embodiment of the disclosure, the pumping unit is configured for transferring the fermented wort in a first transfer line from the container into the separation unit, and in a second transfer line transferring the green beer from the separation unit and to an outlet, and wherein the flow outlet 10 of the extraction unit is fluidly connected with the first transfer line 10a, the second transfer line 10b, or the container 10c.

The fermentation container 7 may be configured for containing fermenting wort, e.g. it may be configured for containing wort and yeast under conditions allowing fermentation of wort by said yeast.

For efficient fermentation and easy transfer of the fermented wort from the fermentation container, the fermentation container is advantageously a cylindrical conical tank (CCT).

In an embodiment of the disclosure, the fermentation container is a cylindrical conical tank (CCT).

Advantageously, the separation unit is configured for converting fermented wort into green beer, i.e. by removing at least 70% of the solids. Fermenting wort typically comprises solids in the form of yeast cells, and/or particles of hop or parts thereof. Such separation is efficiently obtained using a centrifuge.

In an embodiment of the disclosure, the separation unit is configured for removing at least 70% of the solids, more preferably at least 80 or 90%. In a further embodiment, the separation unit is configured for removing solids, said solids comprising yeast cells and/or hop or parts thereof. In a further embodiment, the separator unit is a centrifuge.

Mechanical processing steps such as pumping, centrifuging, shearing, and cavitation, may produce thermal energy. The released thermal energy will result in heating of the hop mixture, hop aroma extract, or green beer. Shearing and cavitation is advantageously carried out at temperatures below the ambient 25° C., and green beer or lagering beer is advantageously stored at lower temperatures. Depending on the type of yeast used for fermentation specific, low temperatures may also be preferred during fermentation. Thus, the system advantageously comprises one or more cooling units. Further advantageously, at least one cooling unit is placed adjacent to the shearing unit, and/or the cavitation unit.

In an embodiment of the disclosure, the system comprises one or more cooling units.

Method

The present disclosure provides a method of producing a beer product, comprising the steps of: preparing a hop aroma extract, and adding the prepared hop aroma extract to a fermented wort or a green beer.

Advantageously the method is configured to be carried out in the system described above.

When the hop aroma extract is added to a fermented wort, the fermented wort including the extract is subsequently converted to a green beer. Thus, the fermented wort and extract is subjected to a step of removing part of the solids from the fermented wort. Advantageously, the removal is obtained by phase separation means, such as a centrifuge. This further has the advantage that solid particles originally present in the hop aroma extract, e.g. hops or parts thereof, may be removed. This may affect the taste as well as the visual appearance of the resulting green beer.

In an embodiment of the disclosure, the method comprises a step of removing a part of the solids from the fermented wort. In a further embodiment, the removal is obtained by phase separation means, such as a centrifuge. In a further embodiment, at least 70 wt % of the solids are removed, more preferably at least 80 or 90 wt %.

The hop aroma extract according to the present disclosure was seen to comprise a surprisingly high sum of extracted components as well as a surprisingly high relative ratio of selected components, as further described in Example 1. The extracted hop components further comprised a surprisingly high concentration of the more tasteful aromas, such as myrcene and linalool. Thus, the produced hop aroma extract has a composition and concentrations facilitating that only small volumes of the extract is needed for providing an tasteful beer. Thus, an equally tasteful beer may be obtained using an extract, produced from a smaller amount of hop raw material, as also illustrated in Example 1.

It was surprisingly seen that the amount of dry hops raw material may be reduced by about 20 wt %. This corresponds to that it is sufficient to use in the range of 2-25 kg dry hops per hectoliter beer.

In an embodiment of the disclosure, the aroma extract is added in an amount corresponding to between 2-25 kg dry hops per hectoliter beer, more preferably between 4-20 kg dry hops per hectoliter beer, such as in the range of 4 to 8 kg dry hops per hectoliter beer, for example approximately 6, 12, or 20 kg dry hops per hectoliter beer.

System and Method for Continuous Production of a Beverage

The improved aroma extraction of the present disclosure facilitates increased production flexibility, including production upscaling. Since the aroma extraction efficiency and/or selectivity is increased, a similar extraction may be obtained when using a continuous extraction processes, compared to a batch extraction process. A continuous extraction process is typically faster, simpler, and more easily upscaled to larger volumes, compared to a batch process.

Thus, advantageously the aroma extraction unit is adapted to operate continuously, meaning that the mixture of plants/hops and liquid is transferred continuously from the mixing vessel to the shearing unit, and from the shearing unit to the cavitation unit, and from the cavitation unit, optionally first into a buffer tank, and then back into the mixing tank and/or the shearing unit, as indicated by the arrows in FIGS. 1-3. This circulation through the combined shearing unit and cavitation unit may be repeated any number of times, and one circulation cycle is defined as a circulation through the combined shearing unit and cavitation unit. Following any cycle, all or a part of the mixture may be removed at the flow outlet 10 as indicated in FIGS. 1-3. The amount of flow outlet may be controlled by the flow direction controller 5c, having a first position forming a closed loop for circulation, and a second position wherein at least part of the mixture is removed at the flow outlet.

The aroma extraction mixture removed at outlet 10 may be added to the unfiltered beer feed either before or after the separation unit, as shown with stippled lines in FIG. 3, or added into the fermentation container, as shown with stippled line 10c in FIG. 2.

To ensure continuous operation of the aroma extraction unit, as well as continuous production of the beverage, the amount of fluid removed at the flow outlet 10 is advantageously counterbalanced by an equal amount of fluid supplied to the hydration tank/mixing vessel 2, such that the amount of fluid within the extraction unit is essentially constant during operation. The fluid supplied may be taken from a beer feed line 13 as shown in FIG. 3, where the beer feed may be wort taken before the separation unit 8 or green beer taken after the separation unit, hence the liquid may be non-centrifuged, centrifuged, unfiltered, or filtered beer.

It was surprisingly found that a high aroma extraction efficiency and/or selectivity may be obtained when the beverage feed and the extraction unit are in continuous fluid communication. Advantageously, the continuous fluid communication comprises a continuous fluid supply from the beverage feed to the extraction unit, and a simultaneous continuous fluid removal from the extraction unit and to the beverage feed. Further advantageously, the fluid supplied to and the fluid removed from the extraction unit is the same. For example, the amount of fluid supplied and removed may be 20, 33, or 45hL.

Further advantageously, only a part of the beverage feed is supplied and exchanged with the extraction unit. This means that at least a part of the beverage feed and the extraction unit are in continuous fluid communication. Since only a part of the beverage feed is exchanged with the extraction unit, it may be referred to as partial continuous fluid communication. For example, for a total feed of 450 hL/h only 45 hL/h may be exchanged, or for a total feed of 100 hL/h only 33 hL/h may be exchanged, or for a total feed of 200 hL only 20 hL may be exchanged. It was surprisingly found that for a beverage exchange of between 5-40 vol %, preferably 5-30 or 8-20 vol %, the system is configured to operate at a temperature below 25° C., such as between 1-15° C. or 2-10° C., and preferably at approximately 4° C. Thus, any temperature increase of the mixture associated with the cavitation unit, is reduced upon dilution with the beverage feed.

In an embodiment of the disclosure, the beverage feed and extraction unit are in continuous fluid communication. In a further embodiment, at least a part of the beverage feed and extraction unit are in continuous fluid communication, or in partial continuous fluid communication. In a further embodiment, the partial fluid communication is between 5-40 vol %, more preferably 5-30 or 8-20 vol % of the total beverage feed.

In another and further embodiment of the disclosure, the system is configured for continuously exchanging 10-100 hL/h between the beverage feed and the extraction unit, more preferably between 20-50 hL/h, such as 20, 33, or 45 hL/h.

An example of a system adapted for continuous extraction and beverage production is further described in Example 2.

For continuous production of the beverage product, the hydration tank advantageously has a pre-filled starting status. The hydration tank may be pre-filled with an initial beverage feed, as indicated in FIG. 3. Upon starting continuous operation, the pre-filled beverage feed of the hydration tank is transferred by the circulation unit into the shearing unit and cavitation unit to form an aroma extract, optionally circulating multiple cycles through the shearing unit and cavitation unit, and then the extract is transferred or discharged and mixed into a beverage feed. Simultaneously, the pre-filled beverage feed of the hydration tank is replaced with new beverage feed. The continuous feed of beverage to the hydration tank is advantageously counterbalanced by the discharged amount of extract.

An aspect of the disclosure relates to a method of producing a beverage product, comprising the steps of:
a) providing a beverage feed,
b) splitting the beverage feed into a first volume fraction and a second volume fraction,
c) mixing the first volume fraction with plants or parts thereof within a container subjected to a positive gas flow pressure, thereby forming a mixture,
d) subjecting said mixture to at least one cycle of shearing and cavitation, thereby forming an aroma extract,
e) discharging and mixing at least part of the aroma extract with the second volume fraction, whereby a beverage product is produced.

To control the temperature of the aroma extract and the formed beverage product, the first volume fraction is advantageously a fraction. In an embodiment of the disclosure, the first volume fraction is equal to or below 50% of the beverage feed, more preferably equal to or below 45, 40, 35, 33, 30, 25, or 20%.

To improve the aroma extraction efficiency and selectivity, the mixture is advantageously subjected to multiple cycles of shearing and cavitation. In an embodiment of the disclosure, step (d) is repeated for two cycles, more preferably three or four cycles.

To reduce the amount of solids within the beverage product, the beverage feed is advantageously subjected to a separation step. In an embodiment of the disclosure, the method further comprises a step of separating the beverage feed.

To ensure long-term continuous and upscalable production, the beverage feed to the hydration tank is advantageously constant, and/or the relative beverage feed to the hydration is constant compared to the discharge is constant, such that the liquid volume of the hydration tank and/or cavitation tank as shown in FIG. 3, is constant over time.

In an embodiment of the disclosure, the process is continuous, such that the first volume fraction in step (b) is essentially equal to the discharged aroma extraction volume of step (e).

EXAMPLES

The invention is further described by the examples provided below.

Example 1—Production of an Aroma Extract

Hop aroma extracts were produced in the setup embodied in FIG. 1. 6 kg dry hop/hL.

In a first trial (run 3C): A first amount of hops was added to the hydration tank, and to the tank a first amount of green beer of the type Lager (also referred to as "Brand A") was further added. In a second trial (run 3D): 20 wt % less hops was added to the hydration tank. In both these trials the Lager was prepared without addition of hops during fermentation.

The tank was subjected to a $CO_2$ pressure of 0.5 bar, where the $CO_2$ was provided as a consistent flow at the top of the tank.

The mixture was circulated through the combined shearing unit and hydrodynamic cavitation unit three times, i.e. three cycles, where the shearing unit was a YTRON-Z homogenizer, and the cavitation unit was a ShockWave Xtractor™ from Hydro Dynamics, Inc. Max 4-7 C increase how?

After the third cycle, the flow direction controller was set in the second position, and the extracted mixture was removed at the flow outlet, and added to a green beer.

The composition of the extracted mixture was analysed using gas chromatography (GC) based on the SPME-GC-MS method (solid-phase micro extraction gas chromatography-mass spectrometry).

Table 1 shows the chemical composition of the produced extracts, where the type of extracted components, the amounts, and the sum of extracted components are shown. For comparison, the chemical composition of a Lager beer, which had been dry hopped during fermentation in a conventional manner is included (trial number 3A) in Table 1. The same amount of hop pellets were used for the dry hopping as was using the trial 3C.

For comparison, the chemical composition of a traditional beer using a similar amount of hops in a traditional dry hopping process is include (trial number 3A). The traditional production is as described in the background section, and includes boiling of a mixture of wort together with hops, and subsequent to boiling, the boiled wort is transferred to a fermentation tank and fermented by addition of yeast, and the yeast is later removed before the beer is stored in the lagering, or maturation tank, ready for further use. The hops are in the form of pressed hops pellets and added to the wort in the fermentation tank at the onset or during wort fermentation.

The traditional dry hopping process (trial number 3A) was observed to result in a sum of extracted hop components of 191 µg/l, of which 6 µ/I is myrcene and 120 µ/I is linalool.

A much higher sum of extracted hop components was observed for the extracts obtained by method of the present disclosure. For the extract obtained from the traditional amount of hops (run 3C), the sum of extracted hop components is 551 µg/l, of which 170 µ/I is myrcene and 215 µ/I is linalool. For the extract obtained by using 20 wt % less hops (run 3D), the sum of extracted hop components is 466 µg/l, of which 130 µ/I is myrcene and 190 µ/I is linalool.

Thus, a more efficient and selective hop extraction was obtained using the method of the present disclosure.

Example 2: Continuous System

The system shown in FIG. 3 was used with a total beverage feed 13 of 100 hL per hour. Before starting the system, the extraction unit was filled to the capacity, e.g. the buffer tank was filled e.g. to a full capacity of 40 hL.

When the buffer tank is filled, a part of the 100 hL/h beverage feed is added to the aroma extraction unit, more specifically 33 hL/h of the feed was continuously added to the mixing vessel 2, and simultaneously, 33 hL/h was removed at the flow outlet 10.

Thus, a continuous aroma extraction and a continuous beverage production is obtained, facilitating a high production rate. Due to the continuous partial fluid exchange between the beverage feed and the extraction unit, the temperature of the system is below 25° C.

Example 3: Oxygen Uptake

The oxygen uptake from the surroundings and into the extraction unit was measured, and particularly the oxygen uptake from the surroundings and into the hydration tank was measured, during and after the supply of hops to the hydration tank.

For the extraction unit without a hopper unit, as embodied in FIG. 1, an oxygen uptake may be measured after the supply of hops. However, for the extraction unit with the

TABLE 1

Chemical composition of aroma extracts obtained by of the method according to the present disclosure (trial number 3C and 3D), wherein the extract is obtained by using respectively a traditional amount of hop (3C), or 20 wt % less hop (3D). For comparison, the chemical composition of a traditional beer using a traditional amount of hops in a dry hopping process is include (trial number 3A).

| Trial number | ug/l | Isobutyl isobutyrate | Myrcene | Isoamyl isobutyrate | Limonene |
|---|---|---|---|---|---|
| 3A | Traditional | 10 | 6 | 1 | 1 |
| 3C | Cavihop | 30 | 170 | 5 | 1 |
| 3D | Cavihop, −20% hop load | 25 | 130 | 5 | 1 |

| Trial number | ug/l | Linalool | Citronellyl acetate | a-humulene | a-Terpineol |
|---|---|---|---|---|---|
| 3A | Traditional | 120 | 2 | 4 | 10 |
| 3C | Cavihop | 215 | 1 | 22 | 11 |
| 3D | Cavihop, −20% hop load | 190 | 1 | 19 | 11 |

| Trial number | ug/l | Geranyl acetate | B-Citronellol | Geraniol | Sum of Hop components (ug/l) |
|---|---|---|---|---|---|
| 3A | Traditional | 2 | 16 | 19 | 191 |
| 3C | Cavihop | 5 | 10 | 81 | 551 |
| 3D | Cavihop, −20% hop load | 3 | 12 | 69 | 466 | three hopper units, as embodied in FIG. 3, no detectable oxygen uptake may be measured after the supply of hops. Thus, the hopper units may provide a significant reduction and/or elimination of the detrimental oxygen uptake into the extraction unit.

The oxygen uptake was also measured for a continuously operating system as described in Example 2, comprising one or more hopper units as sketched in FIG. 3, and where the oxygen content was measured using a dissolved oxygen (DO) sensor. The system was used with a total beverage feed 13 of 360 hL/h, and the oxygen content of the beer feed 13 before the aroma extraction unit was measured to ca. 20 ppb.

A part of the 360 hL/h beverage feed was continuously added to the aroma extraction unit, such as 36 hL/h, and simultaneously 36 hL/h was removed at the flow outlet 10. The oxygen content of the 36 hL/h flow within the aroma extraction unit was measured immediately before the flow outlet, and was measured to be ca. 32 ppb, with maximum fluctuations of ca. 10 ppb.

The aroma extraction flow volume of 36 hL/h is discharged at the flow outlet 10 and discharged and mixed into the beverage feed 13. Thus, the resulting oxygen content of the beverage feed mixture after the aroma extraction unit was calculated to be 23.2 ppb (i.e. ((360 hL/h×20 ppb)+(36 hL/h×32 ppb)/360 hL/h).

Consequently, the oxygen content before the extraction unit (20 ppb) is comparable to the oxygen content after the extraction unit (23.2 ppb). Thus, the extraction unit including hopper units were seen to provide a significant reduction and/or elimination of the detrimental oxygen uptake into the extraction unit.

ITEMS

The presently disclosed invention may further be defined by the following items.

1. A hop aroma extraction unit (1), comprising:
    a hydration tank (2) containing a mixture of hops or parts thereof and a liquid, said tank configured to contain a positive gas flow pressure,
    a shearing unit (3) configured for shearing the hop,
    a hydrodynamic cavitation unit (4), and
    at least one circulation unit (5a, 5b), wherein the hydration tank, shearing unit, cavitation unit are in fluid communication, and the at least one circulation unit is configured for circulating the mixture.
2. The unit according to item 1, wherein the circulation unit further comprises a flow direction controller (5c) having a first position forming a closed loop for circulation, and a second position wherein at least part of the mixture is removed at a flow outlet (10).
3. The unit according to any of the preceding items, wherein the at least one circulation unit is configured for circulating the mixture from the tank into the shearing unit, further into the cavitation unit, and from the cavitation unit back into the tank and/or shearing unit.
4. The unit according to any of the preceding items, comprising a first and a second circulation unit, wherein the first circulation unit (5a) is configured for circulating the mixture from the tank into the shearing unit and further into the cavitation unit, and wherein the second circulation unit (5b) is configured for circulating the mixture from the cavitation unit back into the tank and/or shearing unit.
5. The unit according to any of the preceding items, wherein the shearing unit and/or the cavitation unit are configured to operate at a temperature below 25° C., such as between 1-15° C. or 2-10° C., and preferably at approximately 4° C.
6. The unit according to any of the preceding items, wherein the gas is selected from the group of: $CO_2$, $N_2$, and combinations thereof.
7. The unit according to any of the preceding items, wherein the positive gas flow pressure is above 0.1 bar, such as in the range of 0.1 to 1.5 bar.
8. The unit according to any of the preceding items, wherein the gas is a purging gas.
9. The unit according to any of the preceding items, wherein the gas is configured to flow at the top of the tank.
10. The unit according to any of the preceding items, wherein the tank comprises an opening configured for supplying hops or parts thereof to the tank.
11. The unit according to any of the preceding items, wherein the hops are in the form of dry hop pellets.
12. The unit according to any of the preceding items, wherein the liquid comprises between 0.5-12 vol % ethanol, more preferably between 3-10 vol %, such as approximately 5, 6, 7, 8, 9 vol % ethanol.
13. The unit according to any of the preceding items, wherein the liquid is a green beer or recycled green beer.
14. The unit according to any of the preceding items, wherein the tank comprises at least one port (2a) configured such that the mixture is able to circulate into and out from the tank via the port
15. The unit according to any of the preceding items, wherein the tank further comprises a second port (2b) configured to receive the mixture from the cavitation unit.
16. The unit according to any of the preceding items, wherein the tank comprises a third port (2c) configured for supplying liquid to the tank.
17. The unit according to any of the preceding items, further comprising a cavitation tank (6) configured for containing the mixture after the cavitation unit.
18. The unit according to item 17, wherein the cavitation tank is configured to contain a positive gas flow pressure.
19. The unit according to any of items 17-18, wherein the gas is selected from the group of: $CO_2$, $N_2$, and combinations thereof, and/or wherein the positive gas flow pressure is above 0.1 bar, such as in the range of 0.1 to 1.5 bar, and/or wherein the gas is a purging gas, and/or configured to flow at the top of the tank.
20. The unit according to any of the preceding items, wherein the hydration tank and/or cavitation tank comprises stirring means.
21. The unit according to any of the preceding items, wherein the shearing unit is a rotor-stator-system for obtaining shear forces in the mixture.
22. The unit according to any of the preceding items, wherein the cavitation unit is configured for producing shock waves and pressure variations in the mixture.
23. A system for producing a beer product, comprising:
    a fermentation container (7) configured for containing a fermenting wort,
    a separation unit (8) configured for removing a part of the solids of fermented wort, thereby converting the fermented wort into green beer,
    the hop aroma extraction unit according to any of items 2-15,
    at least one pumping unit (9), wherein the fermentation container, separation unit, and extraction unit are in fluid communication, and the at least one pumping unit is configured as transfer means.

24. The system according to item 23, wherein the pumping unit is configured for transferring the fermented wort in a first transfer line from the container into the separation unit, and in a second transfer line transferring the green beer from the separation unit and to an outlet, and wherein the flow outlet (10) of the extraction unit is fluidly connected with the first transfer line (10a), the second transfer line (10b), or the container (10c).

25. The system according to any of items 23-24, wherein the fermentation container is a cylindrical conical tank (CCT).

26. The system according to any of items 23-25, wherein the separation unit is configured for removing at least 70% of the solids, more preferably at least 80 or at least 90%.

27. The system according to any of items 23-26, wherein the separation unit is configured for removing solids, said solids comprising yeast and/or hop or parts thereof.

28. The system according to any of items 23-27, wherein the separator unit is a centrifuge.

29. The system according to any of items 23-27, further comprising one or more cooling units.

30. The system according to any of items 16-19, further comprising a filtration unit (11).

31. A method of producing a hop aroma extract, comprising the steps of:
   a) providing a container containing a mixture of hop or parts thereof and a liquid, and a positive gas flow pressure,
   b) shearing the hop in said liquid, thereby forming a hop slurry,
   c) passing the hop slurry through a hydrodynamic cavitation unit, whereby hop aromas are extracted,
   d) optionally repeating steps (b) and/or (c) a plurality of times, whereby a hop aroma extract is produced.

32. The method according to item 31, wherein the liquid is a green beer or recycled green beer.

33. The method according to any of items 31-32, wherein the slurry is passed through the cavitation unit two or more times, such as three or four times.

34. The method according to any of items 31-33, carried out at a temperature below 25° C., such as between 1-15° C. or 2-10° C., and preferably at approximately 4° C.

35. The method according to any of items 31-34, wherein the extract comprises a sum of extracted hop components between 200-1000 µg/l, more preferably between 400-600 µg/l, such as 466 or 551 µg/l.

36. The method according to item 35, wherein the extracted hop components comprises myrcene and/or linalool, and/or wherein the amount of extracted myrcene is between 10-500 µg/l, more preferably between 50-200 µg/l, such as 130 or 170 µg/l, and/or wherein the amount of extracted linalool is between 150-500 µg/l, more preferably between 180-250 µg/l, such as 190 or 215 µg/l.

37. A method of producing a beer product, comprising the steps of:
   a) preparing a hop aroma extract by the method according to any of claims 31-36
   b) adding the hop aroma extract prepared in step (a) to a fermented wort or a green beer.

38. The method according to item 37, further comprising a step of removing a part of the solids from the fermented wort.

39. The method according to item 38, wherein the removal is obtained by phase separation means, such as a centrifuge.

40. The method according to any of items 38-39, wherein at least 70 wt % of the solids are removed, more preferably at least 80 or 90 wt %.

41. The method according to any of items 37-40, wherein the aroma extract is added in an amount corresponding to between 2-25 kg dry hops per hectoliter beer, more preferably between 4-20 kg dry hops per hectoliter beer, such as 6, 12, or 20 kg dry hops per hectoliter beer.

42. The method according to any one of items 37 to 41, wherein the method further comprises a step of filtering the green beer.

43. The method according to any one of items 37 to 41, wherein the method further comprises a step of lagering the green beer.

44. The method according to any one of items 37 to 41, wherein the method further comprises a step of adding one or more additional compounds to the green beer, wherein said additional compounds for example are $CO_2$ and/or water.

45. The method according to any of items 31-36, configured to be carried out in the unit according to any of items 1-22.

46. The method according to any of items 37-44, configured to be carried out in the system according to any of items 23-30.

REFERENCE NUMBERS

1—hop aroma extraction unit
2—hydration tank or mixing vessel
2a—first port
2a—second port
2c—third port
3—shearing unit
4—hydrodynamic cavitation unit
5—circulation unit
5a—first circulation unit
5b—second circulation unit
5c—flow direction controller
6—cavitation tank or buffer tank
7—fermentation container
8—separation unit
9—pumping unit
10—flow outlet
10a—first transfer line
10b—second transfer line
10c—third transfer line
11—filtration unit
12—hopper unit
12a—first hopper unit
12b—second hopper unit, e.g. gate hopper unit
12c—third hopper unit, e.g. dosing hopper unit
13—beer feed

REFERENCES

[1] U.S. Pat. No. 2,830,904.

The invention claimed is:
1. An aroma extraction unit for selective aroma extraction, comprising:
   a hydration tank suitable for containing a mixture of plants or parts thereof and a liquid, said tank configured to contain a positive gas flow pressure,
   a shearing unit configured for shearing the plants or parts thereof, comprising a rotor and a stator,
   a hydrodynamic cavitation unit, and
   at least one circulation unit, wherein the hydration tank, shearing unit, and cavitation unit are in fluid communication, and the at least one circulation unit is configured for circulating a mixture from the tank into the shearing unit, further into the cavitation unit, and from the cavitation unit back into the tank and/or shearing unit, thereby forming a circulation cycle, the extraction unit comprising a flow outlet after the cavitation unit configured for removing at least a part of the mixture from the circulation cycle, wherein the shearing unit is separate from the cavitation unit and configured for shearing at least 50 vol % of the plants or parts thereof into a characteristic particle diameter of between 1-100 μm.

2. The extraction unit according to claim 1, wherein the rotor of the shearing unit comprises a base plate and a plurality of teeth extending from the base plate and spaced from one another in a circular arrangement.

3. The extraction unit according to claim 2, wherein the plurality of teeth comprises a first plurality of teeth and a second plurality of teeth disposed radially inside of the first plurality.

4. The extraction unit according to claim 2, wherein the stator comprises a base plate and a plurality of teeth extending from the base plate and spaced from one another in one or more circular arrangements.

5. The extraction unit according to claim 4, wherein the one or more circular arrangements of the stator are concentric and radially displaced relative to the rotor teeth.

6. The extraction unit according to claim 1, further comprising a hopper unit adapted for discharging plants into the hydration.

7. The extraction unit according to claim 1 further comprises a flow direction controller having a first position forming a closed loop for circulation between the tank, shearing unit, and cavitation unit, and a second position wherein at least part of the mixture is removed after the cavitation unit at the flow outlet.

8. The extraction unit according to claim 1, wherein one or more cooling units are placed adjacent to the shearing unit and/or the cavitation unit allowing said unit to operate at a temperature below 25° C.

9. The extraction unit according to claim 1, wherein the shearing unit is configured for shearing at least 55, 60, 65, 70, 75, 80, 85, 90, 95, or 99 vol % of the plants or parts thereof into a characteristic particle diameter of between 1-100 μm.

10. A system suitable for producing a beverage product, comprising:
    a beverage feed,
    the aroma extraction unit according to claim 1,
    at least one pumping unit,
    wherein the beverage feed and extraction unit are in fluid communication, and the at least one pumping unit is configured as transfer means for the beverage feed.

11. The system according to claim 10, wherein at least a part of the beverage feed and the extraction unit are configured to be in partial continuous fluid communication.

* * * * *